United States Patent
Shuma

(10) Patent No.: US 7,386,771 B2
(45) Date of Patent: Jun. 10, 2008

(54) REPAIR OF MEMORY HARD FAILURES DURING NORMAL OPERATION, USING ECC AND A HARD FAIL IDENTIFIER CIRCUIT

(75) Inventor: Stephen Gerard Shuma, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 11/275,464

(22) Filed: Jan. 6, 2006

(65) Prior Publication Data
US 2006/0101312 A1     May 11, 2006
US 2007/0162786 A1     Jul. 12, 2007

(51) Int. Cl.
*G11C 29/00* (2006.01)

(52) U.S. Cl. .................. 714/718; 714/764; 714/710

(58) Field of Classification Search ................ 714/718, 714/764, 710
See application file for complete search history.

(56) References Cited

U.S. PATENT DOCUMENTS 4,661,955 A * 4/1987 Arlington et al. .............. 714/6
6,073,258 A * 6/2000 Wheater ..................... 714/718
6,373,758 B1 * 4/2002 Hughes et al. .............. 365/200
6,552,947 B2 * 4/2003 Longwell et al. ........... 365/226
6,795,942 B1 * 9/2004 Schwarz ..................... 714/718

* cited by examiner

*Primary Examiner*—Guy J Lamarre
*Assistant Examiner*—John J Tabone, Jr.
(74) *Attorney, Agent, or Firm*—Schmeiser, Olson & Watts; Michael J. LeStrange

(57) ABSTRACT

A memory sub-system and a method for operating the same. The memory sub-system includes (a) a main memory, (b) an ECC circuit, (c) a hard fail identifier circuit, (d) a repair circuit, (e) a redundant memory, and (f) a threshold setting circuit. The ECC circuit is capable of (i) detecting a first bit fail, (ii) sending an error flag signal to the hard fail identifier circuit, (iii) sending a first location address, a first bit location of the first bit fail, and a repaired data from the first location address to the hard fail identifier circuit. The hard fail identifier circuit is capable of (i) determining the number of times of failure occurring at the first bit fail, (ii) determining whether the number of times of failure is equal to a predetermined threshold value, and (iii) if so, sending a threshold reached signal.

19 Claims, 4 Drawing Sheets

REPAIR OF MEMORY HARD FAILURES DURING NORMAL OPERATION, USING ECC AND A HARD FAIL IDENTIFIER CIRCUIT

BACKGROUND OF THE INVENTION

1. Technical Field

The present invention relates to memory hard failure repair, and more specifically, to hard failure repair during normal operation using an ECC (Error Correction Code) circuit and a hard fail identifier circuit.

2. Related Art

Prior art exists which covers detection and repair of hard failures in a memory device during the manufacturing process (i.e., at time zero). Prior art also exists which covers detection and correction of soft errors in a memory device during normal operation (e.g., Error Correction Code). Prior art also exists which covers memory error detection and address disable or device replacement during normal operation. There is a need for a subsystem (and a method for operating the same) in which hard failures are detected and repaired during normal operation of a memory device.

SUMMARY OF THE INVENTION

The present invention provides a memory sub-system, comprising (a) a main memory; (b) an ECC (Error Correction Code) circuit electrically coupled to the main memory; and (c) a hard fail identifier circuit electrically coupled to the ECC circuit, wherein the ECC circuit is capable of detecting a first bit fail at a first bit location at a first location address of the main memory, wherein the ECC circuit is further capable of sending an error flag signal to notify the hard fail identifier circuit about the first bit fail, wherein the ECC circuit is further capable of sending the first location address of the first bit fail to the hard fail identifier circuit, wherein the ECC circuit is further capable of sending the first bit location of the first bit fail to the hard fail identifier circuit, wherein the ECC circuit is further capable of repairing data from the first location address and sending the repaired data to the hard fail identifier circuit, wherein the hard fail identifier circuit is capable of, in response to the error flag signal being sent, determining and tracking the number of times of failure occurring at the first location address and the first bit location, wherein the hard fail identifier circuit is further capable of determining whether the number of times of failure at the first location address and the first bit location is equal to a predetermined threshold value, and wherein the hard fail identifier circuit is further capable of, in response to the hard fail identifier circuit determining that the number of times of failure is equal to the predetermined threshold value, sending a threshold reached signal to indicate that the first bit fail is a hard fail.

The present invention provides a memory sub-system operation method, comprising providing a memory sub-system which includes (a) a main memory, (b) an ECC (Error Correction Code) circuit electrically coupled to the main memory, and (c) a hard fail identifier circuit electrically coupled to the ECC circuit; in response to a first bit fail at a first bit location and at a first location address of the main memory occurring, using the ECC circuit to send an error flag signal to the hard fail identifier circuit; in response to the first bit fail occurring, using the ECC circuit to further send the first location address of the first bit fail to the hard fail identifier circuit; in response to the first bit fail occurring, using the ECC circuit to further send the first bit location of the first bit fail to the hard fail identifier circuit; in response to the first bit fail occurring, using the ECC circuit to further repair data from the first location address and send the repaired data to the hard fail identifier circuit; in response to the error flag signal being sent, using the hard fail identifier circuit to determine and track the number of times of failure at the first location address and the first bit location; using the hard fail identifier circuit to further determine whether the number of times of failure is equal to a predetermined threshold value; and using the hard fail identifier circuit to further send a threshold reached signal in response to the hard fail identifier circuit determining that the number of times of failure is equal to the predetermined threshold value.

The present invention provides a memory sub-system, comprising (a) a main memory; (b) an ECC (Error Correction Code) circuit electrically coupled to the main memory; (c) a hard fail identifier circuit electrically coupled to the ECC circuit; (d) a repair circuit electrically coupled to the hard fail identifier circuit; (e) a redundant memory electrically coupled to the main memory and the repair circuit; and (f) a threshold setting circuit electrically coupled to the hard fail identifier circuit, wherein the ECC circuit is capable of detecting a first bit fail at a first bit location at a first location address of the main memory, wherein the ECC circuit is further capable of sending an error flag signal to notify the hard fail identifier circuit about the first bit fail, wherein the ECC circuit is further capable of sending the first location address of the first bit fail to the hard fail identifier circuit, wherein the ECC circuit is further capable of sending the first bit location of the first bit fail to the hard fail identifier circuit, wherein the ECC circuit is further capable of repairing data from the first location address and sending the repaired data to the hard fail identifier circuit, wherein the hard fail identifier circuit is capable of, in response to the error flag signal being sent, determining and tracking the number of times of failure occurring at the first location address and the first bit location, wherein the hard fail identifier circuit is further capable of determining whether the number of times of failure at the first location address and the first bit location is equal to a predetermined threshold value, wherein the hard fail identifier circuit is further capable of, in response to the hard fail identifier circuit determining that the number of times of failure is equal to the predetermined threshold value, sending a threshold reached signal to indicate that the first bit fail is a hard fail, wherein the repair circuit is capable of, in response to the threshold reached signal being sent, determining whether there is an available redundant memory location in the redundant memory, wherein the repair circuit is further capable of, in response to the repair circuit determining that there is an available redundant memory location in the redundant memory, selecting the available redundant memory location of the redundant memory to replace a defective main memory location of the main memory at the first location address, such that whenever the first location address of the first bit fail appears on an address bus of the main memory, the selected redundant memory location is accessed instead of the defective main memory location of the main memory, and wherein the threshold setting circuit is capable of providing the predetermined threshold value to the hard fail identifier circuit.

The present invention provides a novel memory sub-system (and a method for operating the same) in which hard failures in a memory device are detected and repaired during the normal operation of the memory device.

DETAILED DESCRIPTION OF THE INVENTION

Figure 1:
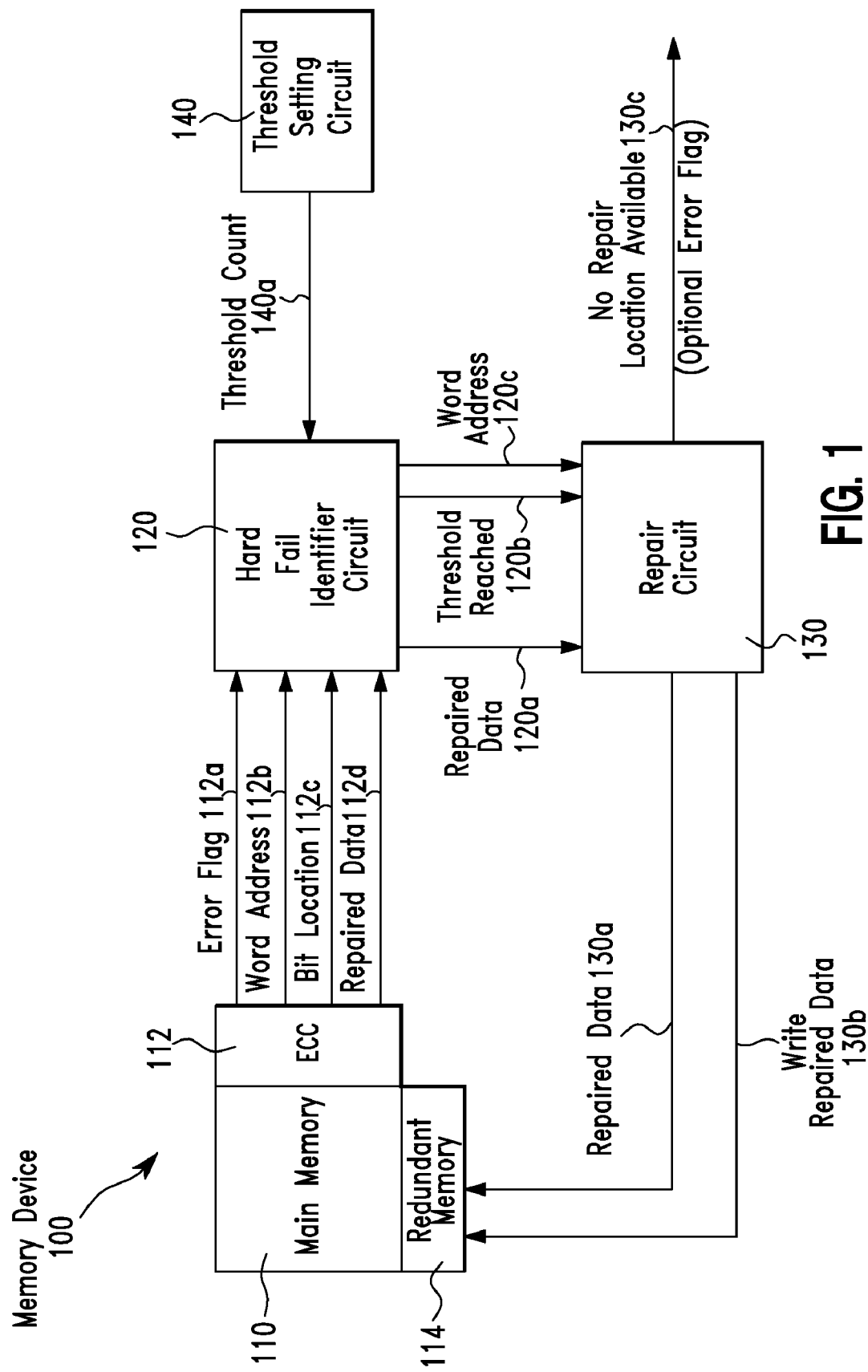
FIG. 1 illustrates a block diagram of a memory sub-system, in accordance with embodiments of the present invention.

FIG. 1 illustrates a block diagram of a memory sub-system 100, in accordance with embodiments of the present invention. Illustratively, the memory sub-system 100 comprises a main memory 110, an ECC (Error Correction Code) circuit 112, a redundant memory 114, a hard fail identifier circuit 120, a repair circuit 130, and a threshold setting circuit 140. In one embodiment, the hard fail identifier circuit 120 receives an error flag signal 112a, a word address signal 112b, a bit location signal 112c, and a repaired data signal 112d from the ECC circuit 112. In one embodiment, the hard fail identifier circuit 120 also receives a threshold count signal 140a from the threshold setting circuit 140. Illustratively, the repair circuit 130 receives a threshold reached signal 120b, a word address signal 120c, and a repaired data signal 120a from the hard fail identifier circuit 120. In one embodiment, the repair circuit 130 sends a repaired data signal 130a and a write repaired data signal 130b to the redundant memory 114. In one embodiment, the repair circuit 130 sends a no repair location available signal 130c to indicate that there are no more redundant memory locations in the redundant memory 114 that can be used to replace a defective main memory location in the main memory 110.

Figure 2:
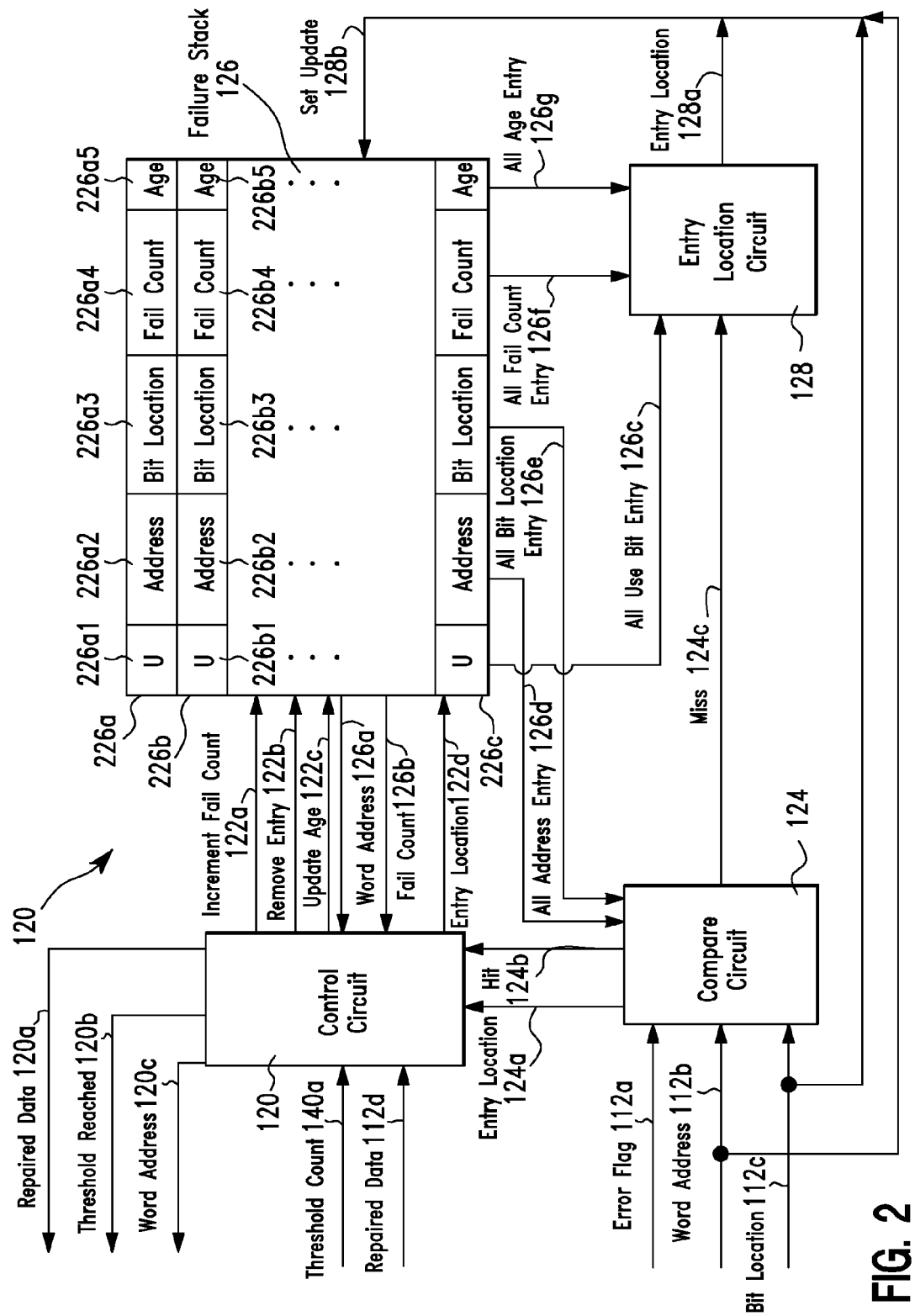
FIG. 2 shows one embodiment of the hard fail identifier circuit of the memory sub-system of FIG. 1, in accordance with embodiments of the present invention.

FIG. 2 shows one embodiment of the hard fail identifier circuit 120 of FIG. 1, in accordance with embodiments of the present invention. Illustratively, the hard fail identifier circuit 120 comprises a compare circuit 124, a control circuit 122, an entry allocation circuit 128, and a failure stack 126.

In one embodiment, the compare circuit 124 receives the error flag signal 112a, the word address signal 112b, and the bit location signal 112c from the ECC circuit 112 of FIG. 1. In one embodiment, the compare circuit 124 also receives an all address entry signal 126d and an all bit location entry signal 126e from the failure stack 126. Illustratively, the compare circuit 124 also sends a hit signal 124b and an entry location signal 124a to the control circuit 122. In one embodiment, the compare circuit 124 also sends a miss signal 124c to the entry allocation circuit 128.

In one embodiment, the control circuit 122 receives the hit signal 124b and the entry location signal 124a from the compare circuit 124. In one embodiment, the control circuit 122 also receives the repaired data signal 112d and the threshold count signal 140a from the ECC circuit 112 and the threshold setting circuit 140, respectively, of FIG. 1. In one embodiment, the control circuit 122 receives a fail count signal 126b from the failure stack 126. Illustratively, the control circuit 122 also receives a word address signal 126a from the failure stack 126 and forwards the word address signal 126a to the repair circuit 130 of FIG. 1 as the word address signal 120c. In one embodiment, the control circuit 122 sends an increment fail count signal 122a, a remove entry signal 122b, an update age signal 122c, and an entry location signal 122d to the failure stack 126. For illustration, the control circuit 122 also sends the threshold reached signal 120b and the repaired data signal 120a to the repair circuit 130 of FIG. 1.

In one embodiment, the entry allocation circuit 128 receives the miss signal 124c from the compare circuit 124. In one embodiment, the entry allocation circuit 128 also receives an all use bit entry signal 126c, an all fail count entry signal 126f, and an all age entry signal 126g from the failure stack 126. Illustratively, the entry allocation circuit 128 also sends an entry location signal 128a to the failure stack 126. It should be noted that the word address signal 112b, the bit location signal 112c (from the ECC circuit 112 of FIG. 1) and the entry location signal 128a (from the entry allocation circuit 128) can be collectively refer to as a set update signal 128b.

In one embodiment, the failure stack 126 comprises multiple entries (like entries 226a, 226b, and 226c). Although the failure stack 126 has many entries, only the three entries 226a, 226b, and 226c of the failure stack 126 are shown in FIG. 2. In one embodiment, the entry 226a comprises a use bit 226a1, an address field 226a2, a bit location field 226a3, a fail count field 226a4, and an age field 226a5. Illustratively, the use bit 226a1 indicates whether the entry 226a is available or unavailable; the address field 226a2 stores address of the fail wordline; and the bit location field 226a3 indicates the location of a bit fail in the fail wordline. In one embodiment, the fail count field 226a4 indicates the number of failure occurrences at an address and at a bit location of the wordline. In one embodiment, the age field 226a5 indicates the time period during which the bit fail entry has been stored or the fail count 226a4 incremented in the entry 226a of the failure stack 126.

Similarly, in one embodiment, the entry 226b comprises a use bit 226b1, an address field 226b2, a bit location field 226b3, a fail count field 226b4, and an age field 226b5. Illustratively, the use bit 226b1, the address field 226b2, the bit location field 226b3, the fail count field 226b4, and the age field 226b5 has the same function as the use bit 226a1, the address field 226a2, the bit location field 226a3, the fail count field 226a4, and the age field 226a5, respectively.

In one embodiment, similarly, the other entries of the failure stack 126 comprise components similar to those of the entry 226a.

Figure 3:
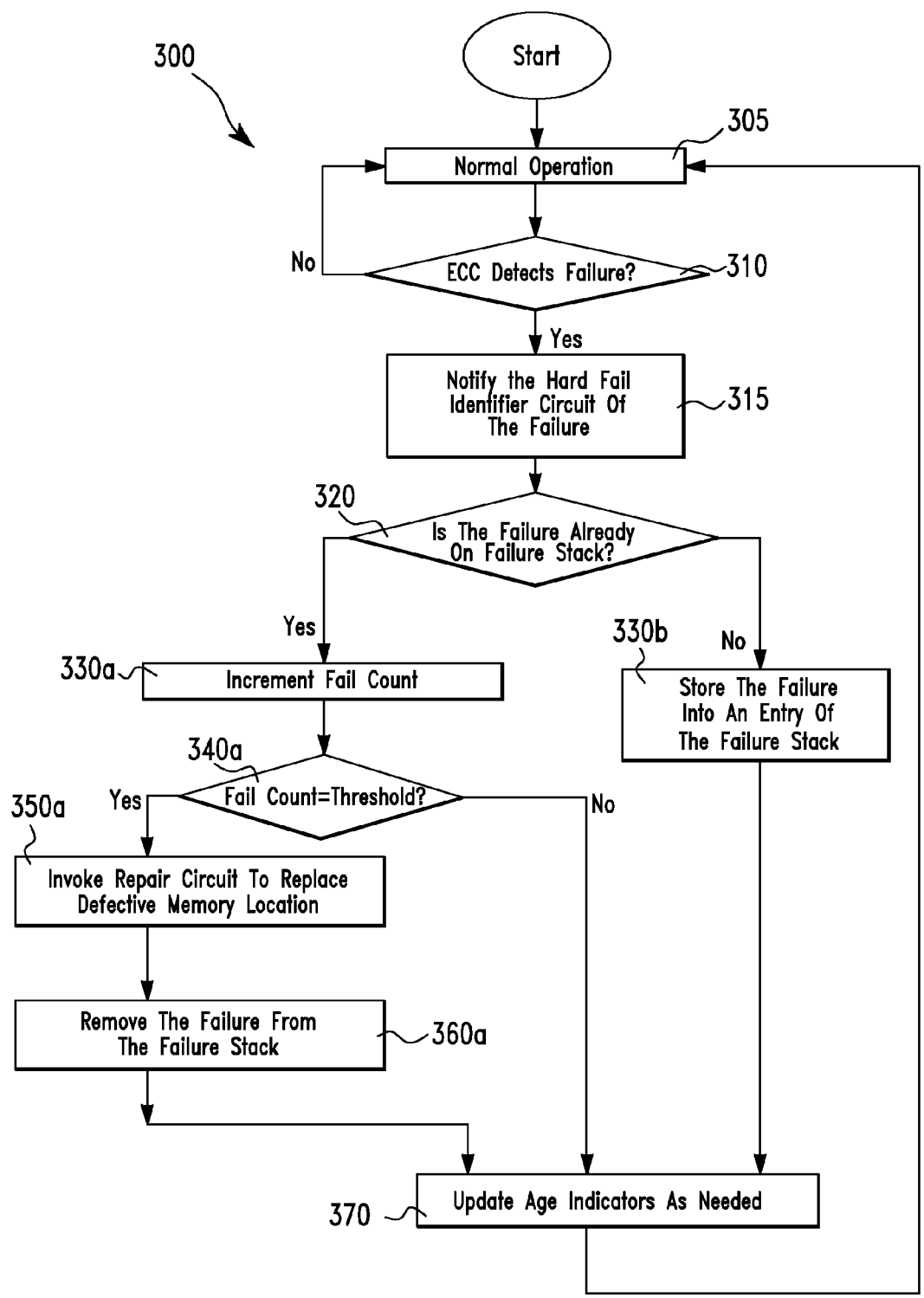
FIG. 3 shows a flowchart that illustrates a method for operating the memory sub-system of FIG. 1, in accordance with embodiments of the present invention.

FIG. 3 shows a flowchart that illustrates a method 300 for operating the memory sub-system 100 of FIG. 1, in accordance with embodiments of the present invention.

In one embodiment, with reference to FIGS. 1, 2, and 3, the method 300 starts with a step 305 in which the main memory 110 is in normal operation.

In one embodiment, in step 310, the ECC circuit 112 of FIG. 1 detects whether a bit fail occurs in the main memory 110 during the normal operation of the main memory 110. As an example, during the normal operation of the memory subsystem 100, assume that the ECC circuit 112 detects a first bit fail at a first bit location of a first word address in the main memory 110. Then a step 315 is performed in which the ECC circuit 112 notifies the first bit fail to the hard fail identifier circuit 120. More specifically, in one embodiment, the ECC circuit 112 sends the error flag signal 112a to notify the hard fail identifier circuit 120 about the first bit fail. In one embodiment, the ECC circuit 112 also sends the first word address of the first bit fail to the hard fail identifier circuit 120 as the word address signal 112b. For illustration, the ECC circuit 112 also sends the first bit location of the first bit fail to the hard fail identifier circuit 120 as the bit location signal 112c. In one embodiment, the ECC circuit 112 also repairs the data from the first word address, and then sends the repaired data to the hard fail identifier circuit 120 as the repaired data signal 112d.

Next, in one embodiment, in a step 320, the compare circuit 124 (FIG. 2) determines whether the first bit fail is in the failure stack 126. More specifically, in one embodiment, by comparing the all address entry signal 126d and the word address signal 112b, and, if an address match is found, by comparing the matching bit location field out of the all bit location entry signal 126e and the bit location signal 112c, the compare circuit 124 can determine whether the first bit fail is already in the failure stack 126. Assume that the failure stack 126 is currently empty. In other words, the first bit fail is not already in the failure stack 126. As a result, a step 330b is performed in which the first bit fail is stored in an entry of the failure stack 126 selected by the entry allocation circuit 128.

More specifically, in one embodiment, in response to the compare circuit 124 of FIG. 2 determining that the first bit fail is not already in the failure stack 126, the compare circuit 124 sends the miss signal 124c to notify the entry allocation circuit 128 that the first bit fail is not in the failure stack 126. In response to the miss signal 124c being sent by the compare circuit 124, the entry allocation circuit 128 examines the all use bit entry signal 126c and determines that all entries of the failure stack 126 are available (because the failure stack 126 is empty, and therefore all use bits of all entries are 0). In response, the entry allocation circuit 128 selects an entry in the failure stack 126 via the entry location signal 128a. In response, in one embodiment, the first bit fail is stored in that selected entry. Assume that the entry 226a is selected for storing the first bit fail. As a result, the use bit 226a1 of the entry 226a is set to 1 to indicate the entry 226a becomes unavailable. Also, the address field 226a2 stores the first word address 112b; the bit location field 226a3 stores the first bit fail location 112c; and the fail count field 226a4 is set to 1.

Next, in one embodiment, in step 370, the age fields of all unavailable entries (i.e., entries whose use bits are 1) in the failure stack 126 are updated. More specifically, the age fields of all unavailable entries are edited to show which entry was updated most recent, which was updated next most recent, etc. As a result, the age field 226a5 of the entry 226a edited to indicate that entry 226a was most recently updated.

In one embodiment, it should be noted that the steps 310, 315, 320, 330b, and 370 are performed simultaneously with the normal operation of the main memory 110 (step 305).

In summary, the ECC circuit 112 of FIG. 1 detects the first bit fail and notifies to the hard fail identifier circuit 120 of FIG. 1. In response, the hard fail identifier circuit 120 of FIG. 1 stores the first bit fail into the entry 226a of the failure stack 126.

Assume at a later time that, in the step 310, the ECC circuit 112 of FIG. 1 detects a second bit fail at a second bit location of a second word address in the main memory 110. In response, in the step 315, the ECC circuit 112 notifies the hard fail identifier circuit 120 about the second bit fail in a manner similar to the manner in which the ECC circuit 112 notifies the hard fail identifier circuit 120 about the first bit fail.

Assume further that the second word address is different from the first word address, or the second bit location is different from the first bit location. This means that the second bit fail is not already in the failure stack 126. As a result, the hard fail identifier circuit 120 of FIG. 1 stores the second bit fail into an available entry of the failure stack 126. Assume that the entry 226b is selected to store the second bit fail. In one embodiment, the hard fail identifier circuit 120 stores the second bit fail the entry 226b in a manner similar to the manner in which the hard fail identifier circuit 120 stores the first bit fail in the entry 226a.

Assume at a later time that, in the step 310, the ECC circuit 112 of FIG. 1 detects a third bit fail at a third bit location of a third word address in the main memory 110. In response, in the step 315, the ECC circuit 112 notifies the hard fail identifier circuit 120 about the third bit fail in a manner similar to the manner in which the ECC circuit 112 notifies the hard fail identifier circuit 120 about the first and the second bit fails.

Assume further that the third word address is the same as the first word address, and the third bit location is the same as the first bit location. This means that the third bit fail is already in the failure stack 126. More specifically, the third bit fail is already stored in the entry 226a. As a result, the step 330a is performed.

In one embodiment, in the step 330a, the fail count field of the entry 226a is increased by 1 to become 2 to indicate that two failures have occurred at the first bit location of the first word address. More specifically, in response to the compare circuit 124 determining that the third bit fail is already in the failure stack 126, the compare circuit 124 sends the hit signal 124b to notify the control circuit 122. In one embodiment, the compare circuit 124 also provides the control circuit 122 with the entry location of the first and the third bit fail (i.e., the entry 226a) via the entry location signal 124a. In response, the control circuit 122 sends the increment fail count signal 122a and entry location signal 122d (from the signal 124a) to cause the failure stack 126 to increment the value of the fail count field 226a4 of the entry 226a by 1. As a result, the value of the fail count field 226a4 of the entry 226a becomes 2 indicating that two failures have occurred at the first word address and at the first bit location.

Next, in one embodiment, in the step 340a, the control circuit 122 determines whether the fail count field 226a4 of the first bit fail is equal to a predetermined threshold value that was provided previously by the threshold setting circuit 140 of FIG. 1 via the threshold count signal 140a. More specifically, the control circuit 122 compares the value of the fail count field 226a4 that comes via the fail count signal 126b with the predetermined threshold value that comes via the threshold count signal 140a. Assume that the predetermined threshold value is 3. As a result, the value of the fail count field 226a4 of the entry 226a, which is 2, is less than the predetermined threshold value which is 3, and therefore the step 370 is performed.

More specifically, in the step 370, the age fields of all unavailable entries in the failure stack 126 are edited to show which entry was updated most recent, which was updated next most recent, etc. In other word, the age field 226a5 of the entry 226a and the age field 226b5 of the entry 226b are edited to indicate that entry 226a was most recently updated, and entry 226b was next most recently updated.

In one embodiment, it should be noted that the steps 310, 315, 320, 330a, 340a and 370 are performed simultaneously with the normal operation of the main memory 110 (step 305).

Assume alternatively that the predetermined threshold value is 2 (instead of 3). As a result, the value of the fail count field 226a4 of the entry 226a is equal to the predetermined threshold value, and therefore a step 350a is performed.

In one embodiment, in the step 350a, the repair circuit 130 determines whether there is an available redundant memory location in the redundant memory 114. In response to the repair circuit 130 determining that there is an available redundant memory location in the redundant memory 114, the repair circuit 130 selects the available redundant location of the redundant memory 114 and re-routes the defective main memory 110 first word address to the selected redundant memory 114 location address. It should be noted that a main memory 110 location that causes failure a number of times equal to the predetermined threshold value is considered defective and needs to be replaced by an available redundant location of the redundant memory 114. Next, the repair circuit 130 sends the repaired data signal 130a and a write repaired data signal 130b to the redundant memory 114. This causes the repaired data 130a to be written into the selected location in the redundant memory 114. More specifically about the step 350a, in one embodiment, in response to the control circuit 122 determining that the fail count field 226a4 of the first bit fail is equal to the predetermined threshold value of 2, the control circuit 122 sends the threshold reached signal 120b to notify the repair circuit 130 that there is a defective main memory 110 location that needs to be replaced. It should be noted that the defective main memory 110 location is considered a hard failure. In one embodiment, the control circuit 122 also forwards the first word address (the word address signal 126a) from the failure stack 126 to the repair circuit 130 (via the word address signal 120c). In one embodiment, the control circuit 122 also forwards the repaired data from the first word address (the repaired data signal 112d) from the ECC circuit 112 of FIG. 1 to the repair circuit 130 (via the repaired data signal 120a). In response, the repair circuit 130 determines that there is the available redundant memory location in the redundant memory 114 and selects the available location of the redundant memory 114 to replace a defective main memory location of the main memory 110 at the first word address. As a result, for future normal operation, whenever the first word address appears on the address bus of the main memory 110, the repair circuit 130 re-directs the address to point to the selected location of the redundant memory 114 (FIG. 1). Next, the repair circuit 130 sends the repaired data signal 130a and a write repaired data signal 130b to the redundant memory 114. This causes the repaired data 130a to be written into the selected location in the redundant memory 114 and enables normal operation to continue.

It should be noted that the repair of the defective main memory location of the main memory 110 at the first word address can be a hard repair of a soft repair. A hard repair can be defined as a repair that remains in effect even if the power to the memory sub-system is cut off. A soft repair can be defined as a repair that disappears if the power to the memory sub-system is cut off.

Next, in one embodiment, in a step 360a, the first bit fail is removed from the failure stack 126. More specifically, in one embodiment, the control circuit 122 sends the remove entry signal 122b and entry location signal 122d (from the signal 124a) to notify the failure stack 126 that the first bit fail needs to be removed from the entry 226a. In response to the remove entry signal 122b being sent, the failure stack 126 resets the use bit 226a1 of the entry 226a to 0 to indicate that the entry 226a is again available.

Next, in one embodiment, in the step 370, the age fields of all unavailable entries (i.e., entries whose use bits are 1) in the failure stack 126 are updated. More specifically, the age fields of all unavailable entries are edited to show which entry was updated most recent, which was updated next most recent, etc. As a result, the age field 226b5 of the entry 226b is edited to indicate entry 226b was most recently updated.

In one embodiment, it should be noted that the steps 310, 315, 320, 330a, 340a, 350a, 360a and 370 are performed simultaneously with the normal operation of the main memory 110 (step 305).

In the embodiment described above, the third word address is the same as the first word address and the third bit location is the same as the first bit location. Alternatively, in the step 320, if the third word address is same as the first word address but the third bit location is different from the first bit location, then the step 330b is performed. In other words, the third bit fail is not already in the failure stack 126 and needs to be stored in an available entry of the failure stack 126 in a similar manner as the first and second bit fails were stored in entries 126a and 126b.

In one embodiment, assume alternatively that when the compare circuit 124 of FIG. 2 sends the miss signal 124c to notify the entry allocation circuit 128 that the second bit fail is not already in the failure stack 126, the entry allocation circuit 128 finds that there is no available entry in the failure stack 126 to store the second bit fail. More specifically, the entry allocation circuit 128 examines the all use bit entry signal 126c and determines that there is no available entry in the failure stack 126 to store the second bit fail. If so, in one embodiment, the entry allocation circuit 128 can select an unavailable entry of the failure stack 126 to store the second bit fail. In one embodiment, the entry allocation circuit 128 can select an unavailable entry whose fail count field stores the lowest value. More specifically, the entry allocation circuit 128 determines the unavailable entry whose fail count field is the lowest value by comparing the values of fail count fields of all entries in the failure stack 126. In one embodiment, the values of fail count fields of all entries in the failure stack 126 come from the all fail count entry signal 126f. If there is more than one unavailable entry whose fail count fields store the minimum fail count value, then the entry allocation circuit 128 can select the unavailable entry whose age field indicates it was updated the longest time ago. In other words, the entry allocation circuit 128 examines the unavailable entries whose fail count fields are the lowest value to determine the unavailable entry whose age field is the oldest by comparing the values of age fields of those entries. It should be noted that the values of age fields of all entries in the failure stack 126 come from the all age entry signal 126g. In another embodiment, the entry allocation circuit 128 can select the unavailable entry whose age field is oldest by comparing the values of age fields for all entries in the failure stack 126. In summary, the entry allocation circuit 128 selects an entry in the failure stack 126 to store the second bit fail via the entry location signal 128a.

Figure 4:
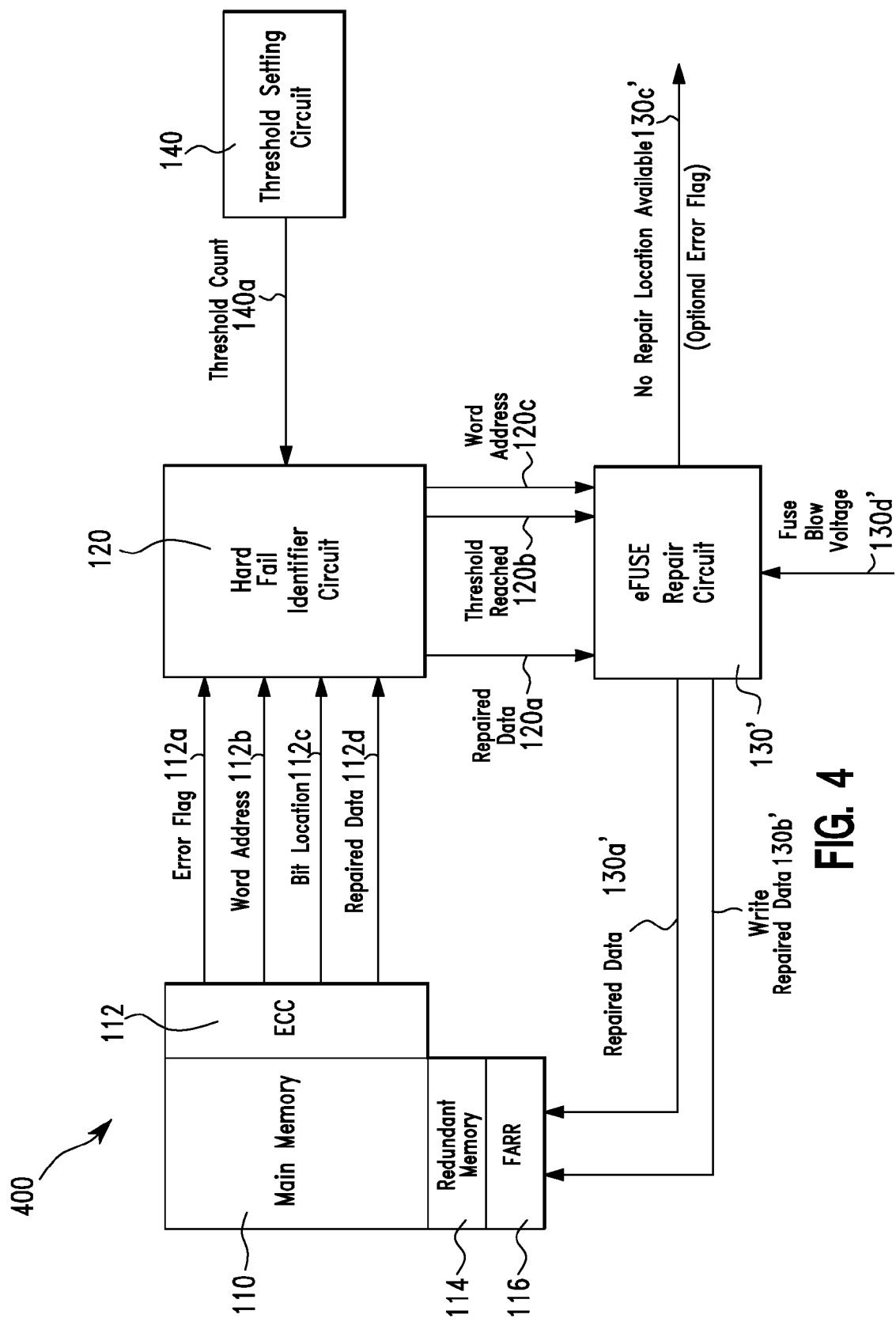
FIG. 4 illustrates another memory sub-system as one embodiment of the memory sub-system of FIG. 1, in accordance with embodiments of the present invention.

FIG. 4 illustrates a memory sub-system 400 as one embodiment of the memory sub-system 100 of FIG. 1, in accordance with embodiments of the present invention. More specifically, an eFUSE repair circuit 130' is used as the repair circuit 130 of FIG. 1. In one embodiment, the memory sub-system 400 includes a FARR (Fuse Address Repair Register) circuit 116 electrically coupled to the redundant memory 114 and the eFUSE repair circuit 130'. In one embodiment, the eFUSE repair circuit 130' also receives a fuse blow voltage 130d' that is used to blow fuses in the eFUSE circuit 130'. In one embodiment, when there is a need to repair a defective main memory location of the main memory 110, the eFUSE repair circuit 130' selects a redundant memory location of the redundant memory 114 to replace the defective main memory location. More specifically, the eFUSE repair circuit 130' applies the fuse blow voltage 130d' to the eFUSE. The resulting fuse arrangement is used by the FARR 116 such that whenever the word address of the bit fail appears on the address bus of the main memory 110, the replacing redundant memory 114 location is accessed instead of the defective main memory location of the main memory 110.

In the embodiments described above, the fails occur in wordlines. Alternatively, this invention also applies to fails in columns.

In the embodiments described above, the sub-system is connected to a single main memory. Alternatively, this invention could be extended to sharing between memories.

In the embodiments described above, the ECC circuit is capable of detecting/correcting only one fail at a time and the memory subsystem 100 is capable of repairing only one fail at a time. Alternatively, this invention could be extended to detecting and repairing multiple bit fails at a time.

In summary, with reference to FIGS. 1, 2, and 3, the memory sub-system 100 (FIG. 1) keeps track of all failures in the failure stack 126 of FIG. 2. When the number of failures caused by a bit location at a word address reaches the predetermine threshold value, then the main memory location at that word address is considered a defective main memory location (i.e., a hard fail), and therefore is replaced by an available redundant memory location of the redundant memory 114. If there is no available redundant memory location in the redundant memory 114 for replacing the hard fail, then in one embodiment, the repair circuit 130 sends the no repair location available signal 130c to indicate this condition to the system (not shown).

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A memory sub-system, comprising:
(a) a main memory;
(b) an ECC (Error Correction Code) circuit electrically coupled to the main memory; and
(c) a hard fail identifier circuit electrically coupled to the ECC circuit,
  wherein the ECC circuit is configured to detect a first bit fail at a first bit location at a first location address of the main memory,
  wherein the ECC circuit is further configured to send an error flag signal to the hard fail identifier circuit to notify the hard fail identifier circuit about the first bit fail,
  wherein the ECC circuit is further configured to send the first location address of the first bit fail to the hard fail identifier circuit,
  wherein the ECC circuit is further configured to send the first bit location of the first bit fail to the hard fail identifier circuit,
  wherein the ECC circuit is further configured to correct data from the first location address and send the corrected data to the hard fail identifier circuit,
  wherein the hard fail identifier circuit is configured to, in response to the error flag signal being sent, determine and track the number of times of failure occurring at the first location address and the first bit location,
  wherein the hard fail identifier circuit is further configured to determine whether the number of times of failure at the first location address and the first bit location is equal to a predetermined threshold value, and
  wherein the hard fail identifier circuit is further configured to, in response to the hard fail identifier circuit determining that the number of times of failure is equal to the predetermined threshold value, generate a threshold reached signal to indicate that the first bit fail is a hard fail,
wherein the hard fail identifier circuit comprises a failure stack electrically coupled to the ECC circuit,
  wherein the failure stack comprises N entries,
  wherein N is a positive integer,
  wherein each of the N entries comprises a use bit, an address field, an age field, and a bit location field,
  wherein the N entries comprises M unavailable entries and P available entries, M and P being non-negative integers,
  wherein M plus P is equal to N, and
wherein each of the M unavailable entries stores a bit fail.

2. The memory sub-system of claim 1, further comprising:
a repair circuit electrically coupled to the hard fail identifier circuit; and
a redundant memory electrically coupled to the main memory and the repair circuit,
  wherein the repair circuit is configured to, in response to the threshold reached signal being generated, determine whether there is an available redundant memory location in the redundant memory, and
  wherein the repair circuit is further configured to, in response to the repair circuit determining that there is an available redundant memory location in the redundant memory, select the available redundant memory location of the redundant memory to replace a defective main memory location of the main memory at the first location address, such that whenever the first location address of the first bit fail appears on an address bus of the main memory, the selected redundant memory location is accessed instead of the defective main memory location of the main memory.

3. The memory sub-system of claim 2, wherein the repair circuit is further configured to generate a no repair location available signal in response to the repair circuit determining that there is no available redundant memory location in the redundant memory for replacing the defective main memory location in the main memory.

4. The memory sub-system of claim 1, further comprising a threshold setting circuit electrically coupled to the hard fail identifier circuit, wherein the threshold setting circuit is configured to provide the predetermined threshold value to the hard fail identifier circuit.

5. The memory sub-system of claim 1,
  wherein the hard fail identifier circuit is further configured to forward the corrected data to a repair circuit in response to the hard fail identifier circuit determining that the number of times of failure is equal to the predetermined threshold value, and
  wherein the hard fail identifier circuit is further configured to forward the first location address to the repair circuit in response to the hard fail identifier circuit determining that the number of times of failure is equal to the predetermined threshold value.

6. The memory sub-system of claim 5,
wherein the repair circuit is further configured to forward the corrected data and a write repaired data signal to a redundant memory, in response to receiving the threshold reached signal from the hard fail identifier circuit and subsequently identifying an available redundant memory location to be used to replace the failing main memory location, and
wherein the corrected data is written into the selected redundant memory location in response to the write repaired data signal.

7. The memory sub-system of claim 1, further comprising:
an eFUSE repair circuit electrically coupled to the hard fail identifier circuit;
a redundant memory electrically coupled to the main memory; and
an FARR (Fuse Address Repair Register) circuit electrically coupled to the redundant memory and the eFUSE repair circuit,
wherein the eFUSE repair circuit receives a fuse blow voltage,
wherein the eFUSE repair circuit is configured to, in response to the threshold reached signal being generated, determine whether there is an available redundant memory location in the redundant memory,
wherein the eFUSE repair circuit is further configured to, in response to the eFUSE repair circuit determining that there is an available redundant memory location in the redundant memory, select the available redundant memory location of the redundant memory to replace a defective main memory location of the main memory at the first location address, and
wherein the eFUSE repair circuit is further configured to apply the fuse blow voltage to blow out some fuses of the eFUSE circuit, thereby programming the FARR circuit such that whenever the first location address of the first bit fail appears on an address bus of the main memory, the selected redundant memory location is accessed instead of the defective main memory location of the main memory.

8. The memory subsystem of claim 1,
wherein the hard fail identifier circuit further comprises a compare circuit electrically coupled to the ECC circuit and the failure stack,
wherein the compare circuit is configured to, in response to the error flag signal being sent, determine whether the first location address is equal to any of the contents of the address fields of the M unavailable entries in the failure stack, and
wherein the compare circuit is further configured to, in response to the error flag signal being sent and the first location address being found on the failure stack, determine whether the first bit location is equal to the bit location of the matching stack entry.

9. A memory sub-system operation method, comprising:
providing a memory sub-system which includes (a) a main memory, (b) an ECC (Error Correction Code) circuit electrically coupled to the main memory, and (c) a hard fail identifier circuit electrically coupled to the ECC circuit;

in response to a first bit fail at a first bit location and at a first location address of the main memory occurring, using the ECC circuit to send an error flag signal to the hard fail identifier circuit;
in response to the first bit fail occurring, using the ECC circuit to further send the first location address of the first bit fail to the hard fail identifier circuit;
in response to the first bit fail occurring, using the ECC circuit to further send the first bit location of the first bit fail to the hard fail identifier circuit;
in response to the first bit fail occurring, using the ECC circuit to further correct data from the first location address and send the corrected data to the hard fail identifier circuit;
in response to the error flag signal being sent, using the hard fail identifier circuit to determine and track the number of times of failure at the first location address and the first bit location;
using the hard fail identifier circuit to further determine whether the number of times of failure is equal to a predetermined threshold value; and
using the hard fail identifier circuit to further generate a threshold reached signal in response to the hard fail identifier circuit determining that the number of times of failure is equal to the predetermined threshold value,
wherein the hard fail identifier circuit comprises a failure stack electrically coupled to the ECC circuit,
wherein the failure stack comprises N entries,
wherein N is a positive integer,
wherein each of the N entries comprises a use bit, an address field, an age field, and a bit location field,
wherein the N entries comprises M unavailable entries and P available entries, M and P being non-negative integers,
wherein M plus P is equal to N, and
wherein each of the M unavailable entries stores a bit fail.

10. The method of claim 9, further comprising:
in response to the threshold reached signal being generated, using a repair circuit to determine whether there is an available redundant memory location in a redundant memory,
in response to the repair circuit determining that there is an available redundant memory location in the redundant memory, using a repair circuit to further select the available redundant memory location of the redundant memory to replace a defective main memory location of the main memory at the first location address, such that whenever the defective location address appears on the address bus of the main memory, the selected redundant memory location is accessed instead of the defective main memory location of the main memory,
wherein the memory sub-system further includes (i) the repair circuit electrically coupled to the hard fail identifier circuit, and (ii) the redundant memory electrically coupled to main memory and the repair circuit.

11. The method of claim 10, wherein the repair of the defective main memory location of the main memory at the first location address is a hard repair.

12. The method of claim 10, wherein the repair of the defective main memory location of the main memory at the first location address is a soft repair.

13. The method of claim 10, using the repair circuit to further generate a no repair location available signal in response to the repair circuit determining that there is no available redundant memory location in the redundant memory for replacing the defective main memory location in the main memory.

14. The method of claim 9, further comprising using a threshold setting circuit to provide the predetermined threshold value to the hard fail identifier circuit,
wherein the memory sub-system further includes the threshold setting circuit electrically coupled to the hard fail identifier circuit.

15. Method of claim 9, further comprising:
using the hard fail identifier circuit to forward the corrected data to a repair circuit in response to the hard fail identifier circuit determining that the number of times of failure is equal to the predetermined threshold value; and
using the hard fail identifier circuit to forward the first location address to the repair circuit in response to the hard fail identifier circuit determining that the number of times of failure is equal to the predetermined threshold value.

16. The method of claim 15, further comprising:
using the repair circuit to forward the corrected data and a write repaired data signal to the redundant memory, in response to the hard fail identifier circuit determining that the number of times of failure is equal to the predetermined threshold value, and the repair circuit subsequently identifying an available redundant memory location to be used to replace the failing main memory location at the first location address; and
writing the corrected data into the selected redundant memory location in response to the write repaired data signal being sent by the repair circuit.

17. The method of claim 9, further comprising:
using an eFUSE repair circuit to receive a fuse blow voltage;
in response to the threshold reached signal being generated, using the eFUSE repair circuit to determine whether there is an available redundant memory location in a redundant memory;
in response to the eFUSE repair circuit determining that there is an available redundant memory location in the redundant memory, using the eFUSE repair circuit to further select the available redundant memory location of the redundant memory to replace a defective main memory location of the main memory at the first location address; and
using the eFUSE repair circuit to further apply the fuse blow voltage to blow out some fuses of the eFUSE circuit, thereby programming a FARR (Fuse Address Repair Register) circuit such that whenever the first location address of the first bit fail appears on an address bus of the main memory, the selected redundant memory location is accessed instead of the defective main memory location of the main memory,
wherein the memory sub-system further includes (i) the eFUSE repair circuit electrically coupled to the hard fail identifier circuit, (ii) the redundant memory electrically coupled to main memory, and (iii) the FARR (Fuse Address Repair Register) circuit electrically coupled to the redundant memory and the eFUSE repair circuit.

18. A memory sub-system, comprising:
(a) a main memory;
(b) an ECC (Error Correction Code) circuit electrically coupled to the main memory;
(c) a hard fail identifier circuit electrically coupled to the ECC circuit;
(d) a repair circuit electrically coupled to the hard fail identifier circuit;
(e) a redundant memory electrically coupled to the main memory and the repair circuit; and
(f) a threshold setting circuit electrically coupled to the hard fail identifier circuit,
wherein the ECC circuit is configured to detect a first bit fail at a first bit location at a first location address of the main memory,
wherein the ECC circuit is further configured to send an error flag signal to the hard fail identifier circuit to notify the hard fail identifier circuit about the first bit fail,
wherein the ECC circuit is further configured to send the first location address of the first bit fail to the hard fail identifier circuit,
wherein the ECC circuit is further configured to send the first bit location of the first bit fail to the hard fail identifier circuit,
wherein the ECC circuit is further configured to correct data from the first location address and sending the corrected data to the hard fail identifier circuit,
wherein the hard fail identifier circuit is configured to, in response to the error flag signal being sent, determine and track the number of times of failure occurring at the first location address and the first bit location,
wherein the hard fail identifier circuit is further configured to determine whether the number of times of failure at the first location address and the first bit location is equal to a predetermined threshold value,
wherein the hard fail identifier circuit is further configured to, in response to the hard fail identifier circuit determining that the number of times of failure is equal to the predetermined threshold value, generate a threshold reached signal to indicate that the first bit fail is a hard fail,
wherein the repair circuit is configured to, in response to the threshold reached signal being generated, determine whether there is an available redundant memory location in the redundant memory,
wherein the repair circuit is further configured to, in response to the repair circuit determining that there is an available redundant memory location in the redundant memory, select the available redundant memory location of the redundant memory to replace a defective main memory location of the main memory at the first location address, such that whenever the first location address of the first bit fail appears on an address bus of the main memory, the selected redundant memory location is accessed instead of the defective main memory location of the main memory, and
wherein the threshold setting circuit is configured to provide the predetermined threshold value to the hard fail identifier circuit,
wherein the hard fail identifier circuit comprises a failure stack electrically coupled to the ECC circuit,
wherein the failure stack comprises N entries,
wherein N is a positive integer,
wherein each of the N entries comprises a use bit, an address field, an age field, and a bit location field, wherein the N entries comprises M unavailable entries and P available entries, M and P being non-negative integers, wherein M plus P is equal to N, and wherein each of the M unavailable entries stores a bit fail.

19. The memory device of claim 18, wherein the hard fail identifier circuit is further configured to forward the corrected data to the repair circuit in response to the hard fail identifier circuit determining that the number of times of failure is equal to the predetermined threshold value, and wherein the hard fail identifier circuit is further configured to forward the first location address to the repair circuit in response to the hard fail identifier circuit determining that the number of times of failure is equal to the predetermined threshold value.

* * * * *